United States Patent Office 2,934,377
Patented Apr. 26, 1960

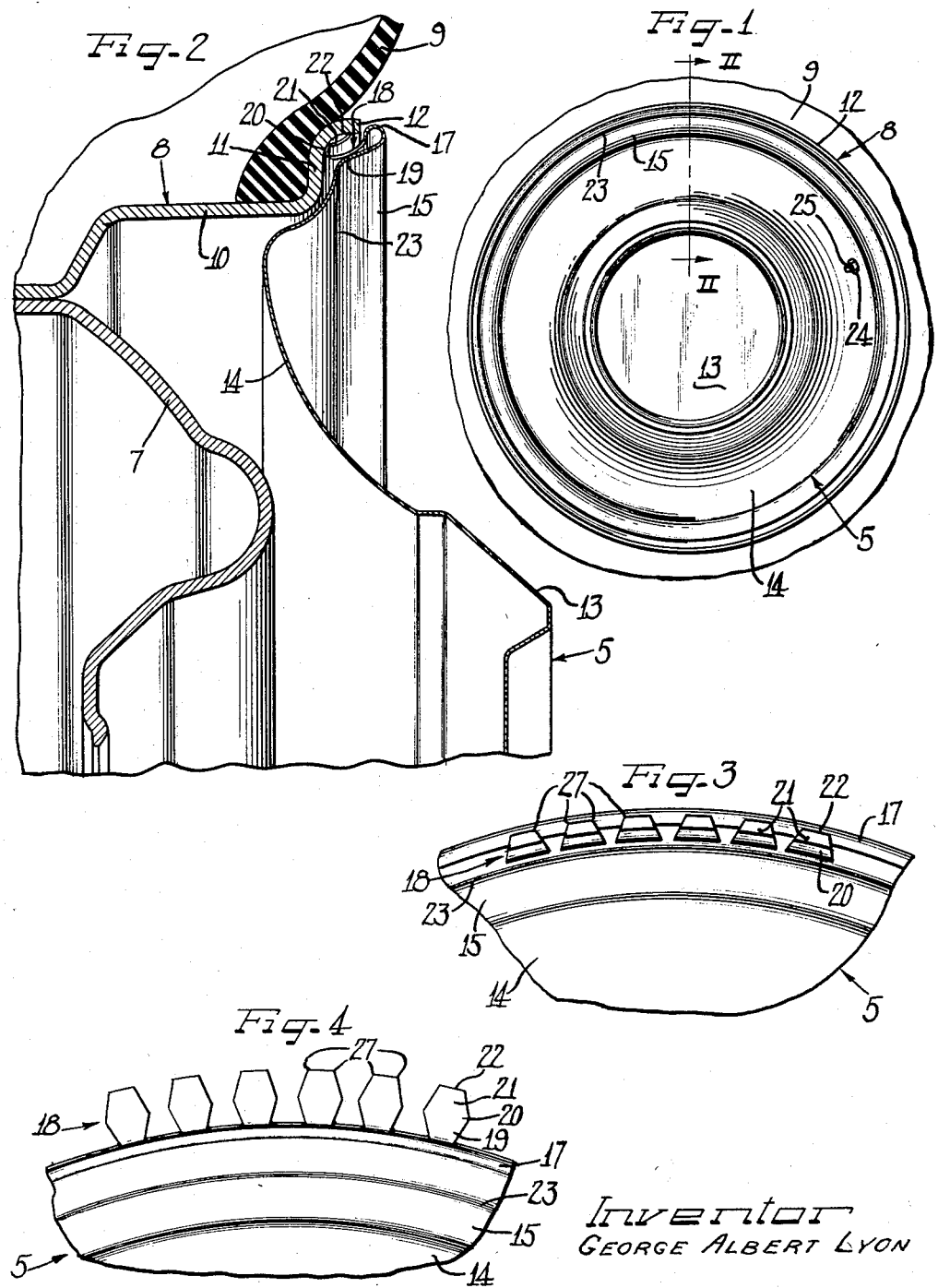

2,934,377
WHEEL COVER
George Albert Lyon, Detroit, Mich.
Application July 27, 1956, Serial No. 600,593
4 Claims. (Cl. 301—37)

The present invention relates to improvements in the ornamental and protective covering of the outer sides of vehicle wheels such as automobile wheels.

An important object of the present invention is to provide an improved wheel structure having on the outer side thereof a wheel cover with novel retaining finger means.

Another object of the invention is to provide improved means for press-on, pry-off retention of wheel covers on the outer sides of vehicle wheels.

A further object of the invention is to provide improved wheel cover construction for press-on, pry-off relation at the outer sides of relatively small diameter vehicle wheels.

Still another object of the invention is to provide in a wheel cover improved retaining finger structure enabling the cover to be conveniently applied to the outer side of a vehicle wheel by retaining engagement with the terminal flange of the tire rim of the wheel.

Yet another object of the invention is to provide improved retaining finger means for wheels covers.

Other objects, features and advantages of the present invention will be readily apparent from the following detailed description of a preferred embodiment thereof taken in conjunction with the accompanying drawing, in which:

Figure 1 is an outer side elevational view of a wheel structure embodying features of the invention;

Figure 2 is an enlarged fragmentary radial sectional detail view taken substantially on the line II—II of Figure 1;

Figure 3 is a fragmentary rear elevational view of the cover showing one set of the retaining fingers thereon; and Figure 4 is a fragmentary rear elevational view similar to Figure 3 but showing the retaining fingers in plan before shaping thereof into the final form of Figures 2 and 3.

Presently, the trend in the entire automotive industry is to go over to smaller size wheels, the standard for this having been established at fourteen inches. At the same time, it is desirable to reduce as much as possible the cost of covers for the wheels. With these ends in view, a cover 5 is shown which is adapted to be applied in press-on, pry-off relation at the outer side of a vehicle wheel of the small size mentioned and including a wheel body 7 supporting a multi-flange, drop center tire rim 8 adapted to carry a pneumatic tire 9 which may be of the tubeless variety.

At its outer side, the tire rim 8 has an intermediate generally axially outwardly extending and radially inwardly facing flange 10. Merging with the axially outer side of the intermediate flange 10 is a terminal flange that includes a generally radially outwardly extending and axially outwardly facing portion 11 and a generally axially outwardly extending and radially inwardly facing portion 12 which in the present instance is preferably substantially straight and either cylindrical in the axially outer portion thereof or only slightly angled inboard such as 3 to 5°.

The cover 5 is shown in the present instance as a full disk cover, that is of a diameter to cover the wheel body 7 and the tire rim 8, but it may, in at least certain of the features thereof, be embodied in a trim ring which is cooperable with a central wheel body attached hub cap. In any event the cover 5 is adapted to be made from thin sheet metal such as stainless steel or brass or other suitable strip or metal plate. As shown, centrally the cover 5 has a crown portion 13 for overlying the central portion of the wheel body 7 and merging with an intermediate annular dished portion 14 from which extends generally radially and axially outwardly a marginal tire rim overlying portion 15.

At its radially outer extremity, the outer marginal portion 15 of the cover is provided with an underturned bead-like turned edge portion 17 which is adapted to lie adjacent to the tip of the terminal flange portion 12 in the assembly. The turned edge bead 17 provides a stiff reinforcing and finishing structure for the edge of the cover and also serves as a pry-off shoulder opposite the edge of the terminal flange portion 12.

For press-on, pry-off retaining engagement with the wheel, the underturned edge portion 17 is provided with cover retaining finger extensions 18 integral in one piece therewith and located axially inwardly therebehind and constructed and arranged to engage retainingly with the terminal flange of the tire rim. Herein, the fingers 18 are disposed by groups spaced circumferentially about the periphery of the cover, such for example in four groups of six fingers which individually are relatively narrow but which in the aggregate in each group provide a substantial width rim engaging means. By providing the fingers in spaced groups, it is practicable to derive the material for the fingers from corner portions of a polygonal blank in which the crown portion 13, the intermediate dished portion 14 and the marginal annular portion 15 are drawn in suitable press equipment to provide the circular cover formation.

Construction and relationship of the retaining fingers 18 to one another and to the cover is such that the cover is adapted to be applied to the outer side of the wheel by pressing the same into position with a relatively easy on pressure, but removal of the cover requires substantial pry-off force. To this end, each of the fingers 18 includes a generally axially inwardly extending body or leg portion 19 extending angularly from its integral connection with the generally radially inwardly directed edge of the marginal extremity bead forming flange portion 7 of the cover. At its axially inner portion each of the clip body legs 19 is return-bent generally radially outwardly and then axially outwardly to provide a generally U-shaped formation including an arcuate juncture formation 20 and a generally axially outwardly extending leg portion 21 terminating in a generally radially outwardly turned cover retaining terminal tip 22, the edge of which is retainingly engageable in thrusting, edgewise retaining gripping more or less biting frictional relation against the radially inner face of the terminal flange portion 12 of the tire rim. The clip legs 19 are preferably of a length about the same as the length of the terminal flange portion 12, with the turned juncture portions 20 of the clips engageable as shoulders against the axially facing terminal flange portion 11, while the retaining terminal legs 21 of the fingers are shorter than the width of the terminal flange portion 12 so as to be engageable at the retaining terminals 22 of the fingers with the inner face of the terminal flange portion 12 when the shoulders 20 seat against the terminal flange portion 11.

Although the retaining fingers 18 are of rather small size in relation to the size of the cover, there is a large enough number of the fingers in each group to retainingly engage a substantial arcuate circumferential area of the inner surface of the terminal flange portion 12. Furthermore, the retaining fingers 18 are constructed in a manner to so cooperate with the cover, and the cover is so constructed as to cooperate with the retaining fingers, that unusually secure retention of the cover on the wheel is attained.

One desirable feature in attaining improved retention resides in providing the marginal cover portion 15 with a backup shoulder 23 of annular form intermediately therein and disposed to project generally axially inwardly and radially outwardly radially inwardly opposite the body leg portions 19 of the retaining clips. In a preferred arrangement the backup shoulder 23 is disposed to be engageable with the clip legs 19 intermediate the ends of the clips and preferably about midway of the length of the clip body legs or slightly closer to the axially inner end portions of the clip legs than to the axially outer end portion. Moreover, preferably the clip legs 19 are arched toward the radially inner sides thereof to implement the backing up coaction of the clip body legs and the shoulder 23.

Normally, when the cover 5 is off of the wheel, the retaining fingers 18 are resiliently sprung away from the backup shoulder 23. Thereby the retaining terminal tips 22 extend to a slightly larger diameter than the inside diameter of the terminal flange portion 12. Hence, in applying the cover to the outer side of the wheel, a valve stem aperture 24 in the intermediate cover portion 14 is centered or registered with relation to a valve stem 25 and the retaining fingers 18 engaged at the outer retaining leg portions 21 thereof against the tip inner edge of the terminal flange portion 12 and axially inward pressure applied. This causes the retaining finger legs 21 to cam inwardly and causes the body leg portions 19 of the fingers to flex resiliently radially inwardly into backed up engagement with the backup shoulder 23 while the retaining terminal tip portions 22 enter into retaining gripping engagement with the inner side of the terminal flange portion 12. By virtue of the backing up of the finger leg portions 19 against the backup shoulder 23, the flexure leverage of the retaining fingers is substantially shortened and substantial resilient tension is developed in the retaining fingers between the backup shoulder 23 and the terminal flange portion 12 affording efficient retaining thrust in the finger tips engaging the terminal flange portion 12.

Substantial enhancement of the resilient tensioning of the retaining fingers 18, as well as other advantages, have been attained herein by increasing the amount of material in the retaining fingers 18 in the juncture bend portion 20 thereof and merging into the body legs 19 and the retaining legs 21. This structure of the juncture or bight portions 20 of the retaining fingers is especially observable in Figures 3 and 4, the latter depicting the fingers and the turned bead 17 before working of the same into the final shape thereof. In doing this, the edge of the bead portion 17 extends generally axially inwardly and the retaining finger portions extend radially outwardly therefrom in flat condition. Then the retaining finger portions are worked into their final form or shape to extend generally axially inwardly and thereafter the bead portion 17 is curled under to its final shape, thereby moving the retaining fingers 18 inwardly toward the backup shoulder 23. In working of the fingers 18, the legs and juncture bight portion 20 are cold work hardened. Since the greatest width of material is in the juncture bight portion 20, and the legs 19 and 21 of the fingers taper toward narrower width therefrom, it will be apparent that the juncture portion between the legs is stiffer and more resistant to deflection than the respective finger legs. Among the advantages of this construction are that by substantially resisting resilient deflection the wider juncture bight portion 20 of the retaining fingers resist collapsing or deflection of the retaining legs 21 thereof toward the backed up body legs 19 incident to radially inward compression of the fingers in engagement with the terminal flange portion 12. Nevertheless, the finger legs 19 and 21 are resiliently deflectable relative to one another and to the cover body. Furthermore, by having the juncture bight portions 20 substantially stiffened as described, the turned juncture bight portions effectively resist turn out. That is, upon the application of pry-off force behind the margin of the cover so that the retaining fingers are forced axially outwardly relative to the tire rim, the tendency of the tips of the finger terminals 22 to resist dislodgment is effectively overcome by axially outward thrust of the short finger legs 21 which due to the stiff juncture portion 20 resists turning out or upon themselves and thus cause the retaining terminal tips to slide axially outwardly toward release from the terminal flange.

Still another advantage of having the retaining fingers 18 provided with the widened, stiffer bend juncture bight portions resides in the resistance of the fingers to canting or twisting out of position due to torque stresses or forces in service while nevertheless enabling a slight amount of rocking of the fingers about their axes responsive to such torque stresses. As a result, the fingers 18 are especially effective to resist turning of the cover on the wheel and thus misalignment of the valve stem aperture 24 relative to the valve stem 25. When there is a torque stress or strain on the cover in either direction, as for example in making fast stops on either forward movement or backup of the vehicle, as the fingers tend to rock about their axes slightly by virtue of the rather flexible thin necked body legs 19, the several corners at the sides of the finger tips, identified at 27, at the respective side toward which the fingers tend to rock or roll tend to bite or dig as spurs into the engaged inner surface of the terminal flange portion 12 and thus effectively resist circumferential sliding of the finger tips along the surface of the flange portion 12. Due to the stiffness in the intermediate, juncture bend portion 20 of the fingers, and the inherent resilience in the finger legs, the fingers promptly return to normal retaining position and likewise return the cover plate to its indexed position relative to the valve stem 25. In other words, the particular construction of the retaining fingers 18 affords a small degree of torsional or rotary flexibility in the cover, with the fingers serving as resilient return springs for the purpose.

In order to remove the cover 5 from the wheel a pry-off tool such as a screwdriver is inserted between the edge bead 17 of the cover and the tip of the terminal flange portion 12 and pry-off leverage applied for starting the cover off of the wheel. Additional pry-off leverage advantage is gained by working the tip of the pry-off tool in behind the indented shoulder 23 and utilizing such shoulder as a pry-off shoulder. Such pry-off shoulder function of the indented rib-like shoulder 23 also serves to prevent damage to the cover from the tip of the pry-off tool since the pry-off tool tip portion will fulcrum on the ridge afforded by the rib and tilt into the clearance provided radially inwardly from the rib with respect to the axially outwardly bulged radially inner section of the marginal cover portion 15. It will be apparent, of course, that the rib 23 also substantially reinforces the cover margin in conjunction with the turned edge bead 17.

It will be understood that modifications and variations may be effected without departing from the scope of the novel concepts of the present invention.

I claim as my invention:

1. In a wheel structure including an annular generally radially facing portion, a cover member for disposition at the outer side of the wheel including a wheel covering body portion and cover retaining fingers carried by the body portion, said fingers including resilient body legs connected at one end to said body portion and resilient retaining terminal legs engageable retainingly against said wheel portion, said body legs being narrower in a portion thereof than the juncture thereof with the terminal leg portion and being thereby resiliently deflectably twistably at least slightly turnable about the axis of the finger responsive to torque forces on the cover so as to enable slight relative turning of the cover for torque pressure relief and by the resilience of the fingers serving as return springs to normalize the relative rotary position of the cover and wheel upon release of torque pressures or forces on the cover, said junctures being spaced from the cover body portion and being thereby freely relatively twistably movable with the finger legs.

2. In a wheel cover for disposition at the outer side of a vehicle wheel, a cover body, and retaining fingers on the cover body including body leg portions connected at one end to the cover body and at the opposite end to respective terminal leg portions with a juncture portion between said leg portions which is substantially wider than the leg portions for increased stiffness of the juncture portion, said leg portions tapering toward narrower dimension away from the juncture portion, said body leg portions being of curved longitudinal shape and being slightly torsionally turnable about their axes due to their tapering narrowness toward the cover body, said terminal leg portions also being of curved longitudinal shape and terminating in radially angled short retaining tips directed away from the body leg portions.

3. In a wheel cover member for disposition over the outer side of a vehicle wheel, a circular body having a turned marginal portion from which project a plurality of circumferentially spaced cover retaining fingers each of which includes a generally axially extending body leg extending from said marginal portion joined in generally U-shape arrangement with a generally oppositely axially extending retaining leg portion having a free end retaining terminal tip, the juncture between said leg portions being substantially wider than the leg portions themselves and the leg portions tapering from the juncture toward the tip of said retaining leg portion and toward the connection of said body leg portion with the cover body portion whereby said juncture between the leg portions is of greater stiffness than the leg portions and said body leg portion is slightly resiliently torsionably turnable about its axis due to being narrower adjacent the cover body.

4. In a wheel cover member for disposition over the outer side of a vehicle wheel, a circular body having a turned marginal portion from which project a plurality of circumferentially spaced cover retaining fingers each of which includes a generally axially extending body leg extending from said marginal portion joined in generally U-shape arrangement with a generally oppositely axially extending retaining leg portion having a free end retaining terminal tip, the juncture between said leg portions being substantially wider than the leg portions themselves and the leg portions tapering from the juncture toward the tip of said retaining leg portion and toward the connection of said body leg portion with the cover body portion whereby said juncture between the leg portions is of greater stiffness than the leg portions and said body leg portion is slightly resiliently torsionably turnable about its axis due to being narrower adjacent the cover body, the cover body having an indented back-up shoulder thereon opposing the finger body leg portions and from which shoulder said finger body leg portions are normally resiliently sprung away into spaced relation when the cover is off of the wheel but against which the finger body leg portions are resiliently flexibly engageable in backed-up flexure leverage shortening relation in the retaining engagement of the finger retaining terminals with a wheel part, said back-up shoulder remaining in spaced relation to said finger leg junctures in said backed-up relation so that said finger legs can twist torsionally in response to torque forces on the cover.

References Cited in the file of this patent

UNITED STATES PATENTS

| | | |
|---|---|---|
| 2,404,389 | Lyon | July 23, 1946 |
| 2,654,637 | Lyon | Oct. 6, 1953 |
| 2,675,271 | Lyon | Apr. 13, 1954 |
| 2,683,629 | Lyon | July 13, 1954 |
| 2,683,631 | Lyon | July 13, 1954 |
| 2,729,509 | Lyon | Jan. 3, 1956 |
| 2,757,976 | Lyon | Aug. 7, 1956 |